2,894,706
HOSE SUPPORT

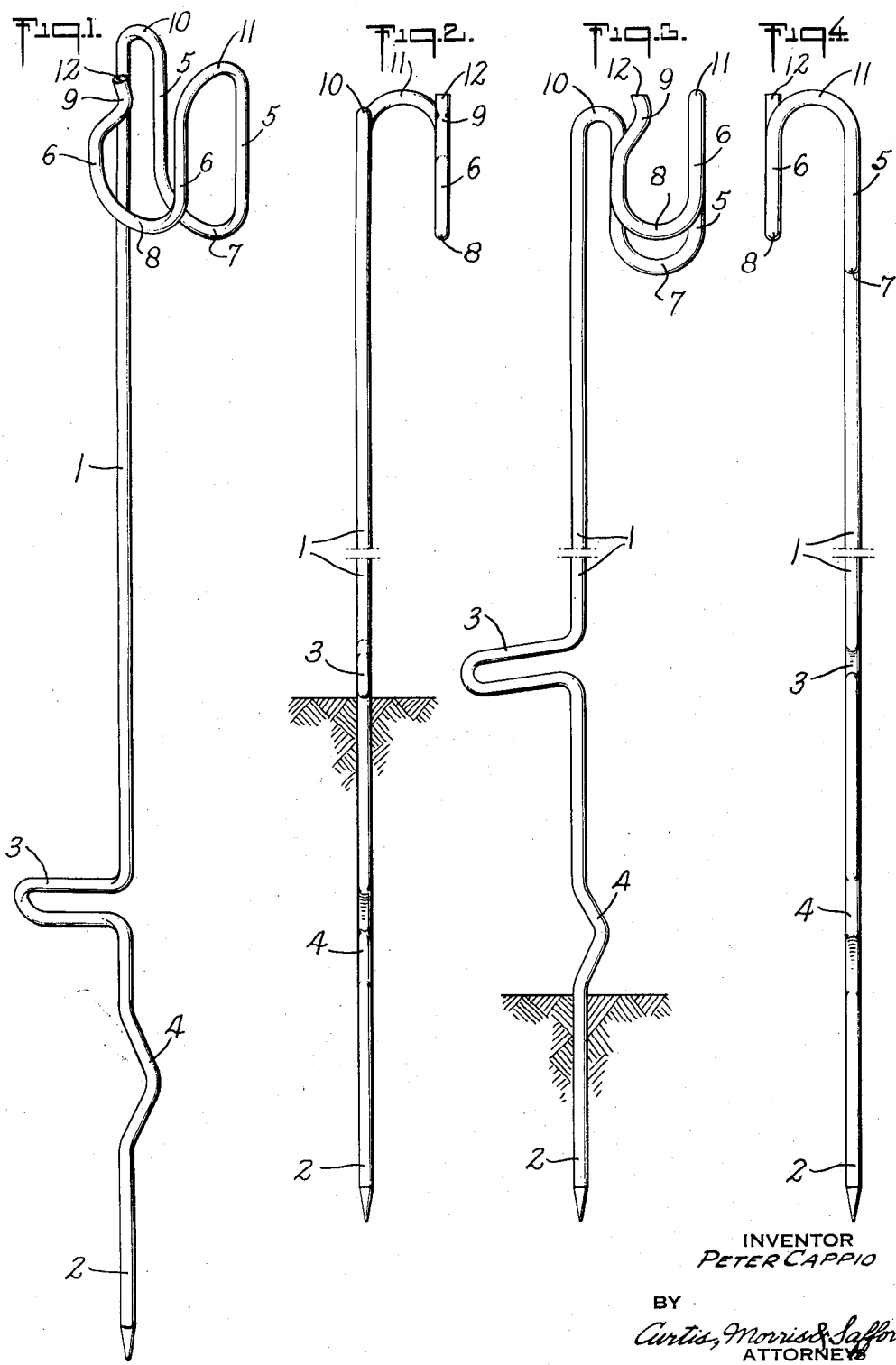

Peter Cappio, Great Neck, N.Y.

Application September 3, 1957, Serial No. 681,532

3 Claims. (Cl. 248—87)

This invention relates to a hose support.

It is an object of the invention to provide a hose support which may be formed from wire or other material and which will support a hose for such functions as lawn sprinkling and the like in various positions, so that it will be possible to accomplish distant, close or intermediate spraying, and so that the spray from the hose may be accurately directed to the area to which it is desired to apply the spray.

It is a further object of the invention to so construct the device that it may be supported on a lawn and moved to various positions without marring the lawn and without removing the hose from the support during the shifting from one position to another.

A still further object of the invention resides in so constructing the device that it will effectively grip the flexible portion of a lawn hose as distinguished from the nozzle and will maintain the same in various desired angular positions.

With these and other objects in view, such as will appear as my description progresses, the invention resides in the combination and arrangement of parts disclosed in the drawing, described in the specification and recited in the claims.

In the drawings:

Figure 1 is a perspective view of one form of my device;

Figure 2 is a side elevation looking at one side of the device as it appears when in operative hose supporting condition;

Figure 3 is a side elevation looking at right angles to Figure 2 but with the device lifted to permit rotation on its vertical axis; and Figure 4 is a side elevation looking at the opposite side of the device as shown in Figure 2.

In the watering of lawns, flower beds or the like, it has been common practice to use a whirling sprayer or a stationary sprayer attached to the end of a hose and to move the sprayer from place to place to accomplish the watering of a larger area than is served by a single spray position. Many difficulties have arisen in the use of such a sprayer and particularly because it has been quite impossible to control the application of the spray to a given area.

The device of this invention makes it possible to spray a lawn, for instance, by inserting the device at a given point in the lawn, securing the hose in position on the device and thereafter changing the angular position of the hose and the character of the spray to apply the spray to distant, close or intermediate areas, without moving the device.

Of course it is possible that in some instances the range of the spray will not be sufficient to cover the entire area to which it is desired to apply water. Therefore the device is so constructed that it may be moved from place to place, or simply rotated with the hose still in place, to cover the desired areas.

The hose support is preferably formed of wire of sufficient rigidity to support a hose without buckling, and also with sufficient inherent resiliency to permit the effective clamping of the hose in position.

In the form of the invention illustrated in the drawings, the device includes a standard 1 which has a prong 2 adapted to be inserted in the earth. Between the standard 1 and the prong 2 a loop-shaped foot-engaging projection 3 is formed, by means of which the prong 2 may be pushed in to the earth until the loop rests upon the ground. Between prong 2 and projection 3 is an elbow or angular offset 4 which serves to impede or resist rotation of standard 1 on its vertical axis when the lower end thereof is sufficiently embedded in the earth to bring offset 4 below the ground level but with projection 3 above ground level, as seen in Figure 2. When the prong 2 extends into the ground only sufficiently to permit the offset 4 to clear the surface, Figure 3, the entire device may be rotated in order to change the lateral direction of the axis of the engaged portion of the hose and consequently of the spray.

Integrally formed with the upper end of the standard 1 is a hose-supporting head that includes a pair of substantially parallel depending loops 5 and 6. The loop 5 is essentially of U shape, as is also the loop 6, the loop 5 merging with or joined to the standard 1 through a generally horizontally disposed bend 10. Loop 6 is joined to the upper end of a leg of loop 5 through a generally horizontally disposed bend 11 lying opposite bend 10 and in a plane substantially parallel to the plane of said bend 10. The bight portion 7 of the loop 5 is lower than the bight portion 8 of the loop 6; and the legs of the loops 5 and 6 have sufficient resiliency to grip a hose when it is placed within them. As shown more clearly in Figures 1 and 3, the free end of loop 6 is provided with a projection 9 which extends inwardly toward the opposite run of said loop and which may be used to restrict the open end of loop 6 and thus retain the hose effectively in contact with the bight portion 8 of said loop 6. The terminal or free end 12 of said loop 6 is also bent back from projection 9 to provide a relatively enlarged outer opening adjacent to the narrower throat or restriction between said projection and said opposite run or leg of loop 6. This facilitates engagement of the hose with said loop 6.

When a hose is placed in the head of the hose support, the nozzle extends beyond the loop 6 and the hose portion is gripped within the loops 5 and 6. When the hose engages the bight portions 7 and 8 of said loops, the hose will be given an upwardly inclined position with the nozzle extending upwardly so that the spray therefrom will reach distant points. If it is desired to apply water to areas nearer the support, the portion of the hose that is gripped between the legs or runs of the loop 5 may be tilted to raise the hose away from the bight portion 7 and thus the angle of inclination of the nozzle will be correspondingly changed to bring the spray to bear on an area closer to the support.

If it is desired, the entire hose support may be rotated on its vertical axis by lifting it sufficiently to clear the offset 4 above the surface of the ground and thus to direct the spray to a different area.

It will be understood that while it is desirable to give the head of the hose support a certain amount of resiliency, this is not necessary since if it is rigid the hose itself may be slightly compressed in its insertion into the head snce the distance between the legs of the loops 5 and 6 will be less than the normal diameter of the hose. In this way the resiliency of the material of the hose will maintain the hose in position.

From the foregoing, it will be seen that I have provided a hose support which makes it possible to so support a hose for the sprinkling of a lawn or the like that its position may be changed to apply a spray of water to distant, close or intermediate areas and to apply the spray to any areas without necessitating the turning off of the water as the adjustments are made, thus relieving the difficulties that have been encountered in using the usual type of spray hereinbefore referred to.

Moreover, my invention relieves the necessity for walking on already soaked areas and it makes it possible to apply the water to the lawn or the like in a fine spray and yet for a sufficient length of time to completely soak the lawn.

While I have illustrated and described a particular embodiment of my invention, it is of course to be understood that some changes in the details of the forms illustrated in the drawings may be made without departing from the spirit of the invention, and within the scope of the appended claims, and I, therefore, do not wish to be limited to the particular forms illustrated except in so far as this is made necessary by the claims.

What I claim is:

1. A hose support formed of a single piece providing a standard having at its lower end a ground penetrating portion including a bent out laterally extending offset for resisting axial turning of the standard in the ground, and at its upper end a pair of spaced substantially parallel U-shaped loops open at their upper ends, a substantially horizontal portion connecting one of said loops to said standard at one side of said pair of loops, and a substantially horizontal portion connecting the said loops together at the opposite side of said pair of loops, said loops extending downwardly and below the upper end of said standard.

2. A hose support formed of a single piece of wire providing a standard having at its lower end a ground penetrating portion including a laterally extending offset for resisting axial turning of the standard in the ground, and at its upper end a pair of spaced substantially parallel U-shaped loops open at their upper ends, a substantially horizontal portion connecting one of said loops to said standard at one side of said pair of loops, and a substantially horizontal portion connecting the said loops together at the opposite side of said pair of loops, said loops extending downwardly and below the upper end of said standard, said loops being substantially parallel with each other and with said standard and the bight portion of the first-mentioned loop being located lower than the bight portion of the second-mentioned loop, said offset comprising a slightly bent-out portion of said wire having smoothly tapered shoulders on each side of its apex.

3. A hose support formed of a single piece providing a standard having at its lower end a ground penetrating portion including a laterally extending smoothly tapered bent out offset for resisting axial turning of the standard in the ground, and at its upper end a pair of spaced substantially parallel U-shaped loops open at their upper ends, a substantially horizontal portion connecting one of said loops to said standard at one side of said pair of loops, and a substantially horizontal portion connecting the said loops together at the opposite side of said pair of loops, said loops extending downwardly and below the upper end of said standard, said loops being substantially parallel with each other and with said standard and the bight portion of the first-mentioned loop being located lower than the bight portion of the second-mentioned loop, and a leg of said second-mentioned loop having an inwardly extending nozzle-engaging projection and an outwardly extending free end portion.

References Cited in the file of this patent

UNITED STATES PATENTS

| | | |
|---|---|---|
| 1,284,010 | Wilbur | Nov. 5, 1918 |
| 1,537,237 | Kaestner | May 12, 1925 |
| 1,591,374 | Hammili | July 6, 1926 |